United States Patent
Morreale et al.

(10) Patent No.: US 11,326,517 B2
(45) Date of Patent: May 10, 2022

(54) OIL DISTRIBUTION DEVICE FOR A ROTATING PLANET CARRIER OF A MECHANICAL REDUCTION GEAR OF A TURBOMACHINE

(71) Applicant: SAFRAN AIRCRAFT ENGINES, Paris (FR)

(72) Inventors: Serge René Morreale, Moissy-Cramayel (FR); Laurent Gille, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 14 days.

(21) Appl. No.: 16/973,606

(22) PCT Filed: Jun. 5, 2019

(86) PCT No.: PCT/FR2019/051339
§ 371 (c)(1),
(2) Date: Dec. 9, 2020

(87) PCT Pub. No.: WO2019/239032
PCT Pub. Date: Dec. 19, 2019

(65) Prior Publication Data
US 2021/0164396 A1 Jun. 3, 2021

(30) Foreign Application Priority Data
Jun. 12, 2018 (FR) ........................................ 1855125

(51) Int. Cl.
*F02C 7/06* (2006.01)
*F02C 7/36* (2006.01)

(52) U.S. Cl.
CPC .................. *F02C 7/06* (2013.01); *F02C 7/36* (2013.01); *F05D 2220/323* (2013.01); *F05D 2260/40311* (2013.01); *F05D 2260/98* (2013.01)

(58) Field of Classification Search
CPC .... F02C 7/06; F02C 7/36; F01D 25/18; F05D 2220/323; F05D 2260/40311; F05D 2260/98
See application file for complete search history.

(56) References Cited

U.S. PATENT DOCUMENTS 6,223,616 B1 * 5/2001 Sheridan ................ F16H 1/2827
  184/6.12
8,484,942 B1 * 7/2013 McCune ................. F01D 25/18
  384/473
(Continued)

FOREIGN PATENT DOCUMENTS

EP 3159578 A1 4/2017
FR 2987416 A1 8/2013
(Continued)

OTHER PUBLICATIONS

International Search Report dated Jul. 29, 2019, issued in corresponding International Application No. PCT/FR2019/051339, filed Jun. 5, 2019, 5 pages.
(Continued)

*Primary Examiner* — Steven M Sutherland
(74) *Attorney, Agent, or Firm* — Christensen O'Connor Johnson Kindness PLLC

(57) ABSTRACT

An oil distribution device for a rotating planet carrier of a step-down gear of a turbomachine is configured to be fixedly joined to a tubular member for supporting a bearing of the planet carrier, said oil distribution device having an oil inlet and a row of oil outlets at the external periphery thereof, said oil distribution device having at least two internal cavities
(Continued)

which are connected in series by at least one calibrated port, one of these cavities, referred to as the receiving cavity, being connected to said oil inlet, and internal calibrated channels for conveying oil which extend substantially radially from said cavities as far as ports of the periphery of the device in order to form said oil outlets.

12 Claims, 11 Drawing Sheets

(56) References Cited

U.S. PATENT DOCUMENTS

| | | | |
|---|---|---|---|
| 8,820,478 B2 | 9/2014 | Gauthier et al. | |
| 8,876,647 B2 | 11/2014 | Gallet et al. | |
| 9,429,225 B2 | 8/2016 | Feraud et al. | |
| 10,458,279 B2 | 10/2019 | Gedin et al. | |
| 2012/0088624 A1* | 4/2012 | Sheridan | F01D 25/16 |
| | | | 184/6.12 |
| 2013/0225353 A1 | 8/2013 | Gallet et al. | |
| 2013/0324343 A1* | 12/2013 | Gallet | F16H 3/44 |
| | | | 475/159 |
| 2015/0300255 A1* | 10/2015 | Gallet | F16H 57/0427 |
| | | | 475/159 |
| 2019/0032514 A1* | 1/2019 | Gedin | F01D 25/18 |

FOREIGN PATENT DOCUMENTS

| | | |
|---|---|---|
| FR | 3041054 A1 | 3/2017 |
| WO | 2010/092263 A1 | 8/2010 |
| WO | 2014/037659 A1 | 3/2014 |

OTHER PUBLICATIONS

Written Opinion of the International Searching Authority dated Jul. 29, 2019, issued in corresponding International Application No. PCT/FR2019/051339, filed Jun. 5, 2019, 5 pages.

English translation of the Written Opinion of the International Searching Authority dated Jul. 29, 2019, issued in corresponding International Application No. PCT/FR2019/051339, filed on Jun. 5, 2019, 6 pages.

* cited by examiner

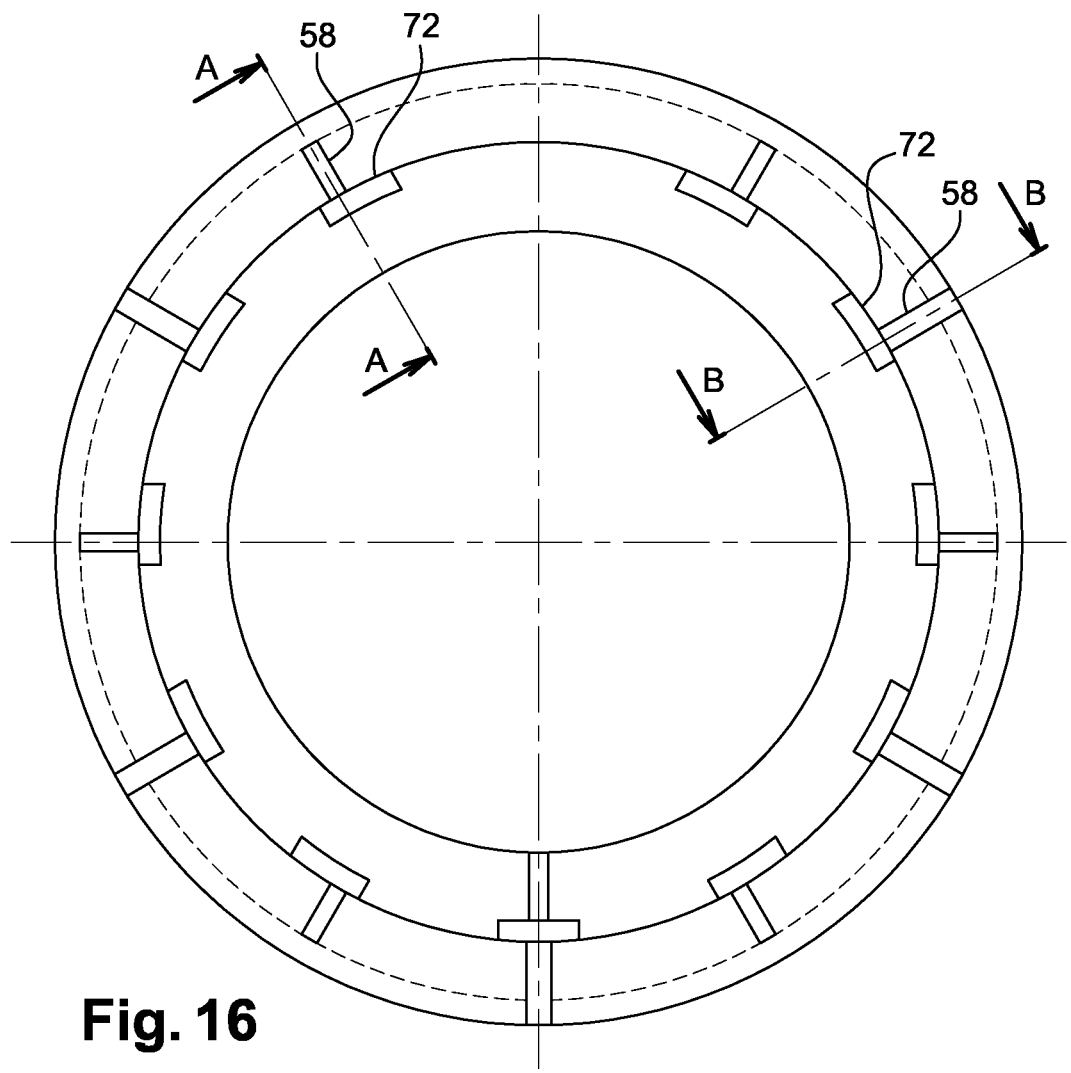
Fig. 16
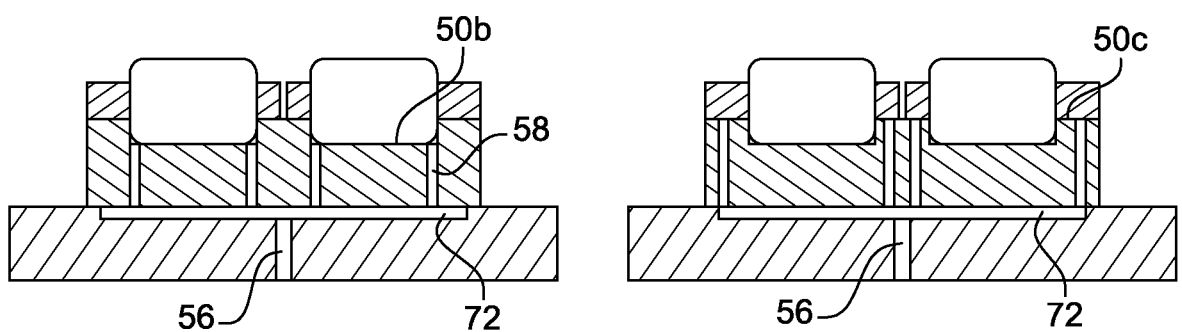
Fig. 17  Fig. 18

OIL DISTRIBUTION DEVICE FOR A ROTATING PLANET CARRIER OF A MECHANICAL REDUCTION GEAR OF A TURBOMACHINE

FIELD OF THE INVENTION

The present invention concerns the field of speed reduction gears for a turbomachine, in particular for aircraft, and more specifically the mechanical reduction gears, the planet carrier of which is rotating, i.e. mobile in rotation. The invention is particularly adapted, but not exclusively, for reduction gears, the planet gears of which are mounted on roller bearings.

BACKGROUND

The prior art comprises the documents EP-A1-3 159 578, WO-A1-2010/092263, FR-A1-2 987 416, FR-A1-3 041 054 and WO-A1-2014/037659.

The role of a mechanical reduction gear is to change the speed ratio and torque between the input axle and the output axle of a mechanism.

The new generations of dual flow turbomachines, in particular those with a high bypass ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called a sun gear, a ring gear and pinions called planet gears, which are meshed between the sun gear and the ring gear. The planet gears are held by a frame called planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several reduction gear architectures. In the prior art of dual-flow turbomachine, the reduction gears are of the planetary or epicyclic type. In other similar applications, there are so-called differential or compound architectures.

- on a planetary reduction gear, the planet carrier is fixed and the ring gear constitutes the output shaft of the device which rotates in the opposite direction to the sun gear.
- on an epicyclic reduction gear, the ring gear is fixed and the planet carrier constitutes of the output shaft of the device which rotates in the same direction as the sun gear.
- on a compound reduction gear, no element is fixed in rotation. The ring gear rotates in the opposite direction of the sun gear and the planet carrier.

The reduction gears can be composed of one or more meshing stages. This meshing is achieved in different ways such as contact, friction or magnetic field.

There are several types of contact meshing such as straight or chevron toothing.

The operation of the reduction gears requires a particularly high oil flow rate to ensure the lubrication and cooling of its mechanical elements.

However, this type of reduction gear has disadvantages related to its lubrication.

In the current technology, a planet gear is generally guided in rotation by a bearing that extends around a tubular support of the planet carrier, this tubular support comprising an internal chamber for receiving oil and substantially radial orifices through which oil can pass from the internal chamber to the bearing.

For an epicyclic reduction gear, it is preferable to guide the planet gears by plain bearings, but it has already been proposed to replace these bearings by roller bearings. The distribution of lubricating oil in such bearings is, however, even more complex because the rollers on the one hand and the cages of the bearings on the other hand must be lubricated effectively. These difficulties are due to the centrifugation of the oil and are therefore due to the fact that the planet carrier is mobile in rotation. In the absence of efficient distribution of oil in the bearings, the oil flow rate is highest at the orifices furthest from the axis of rotation of the planet carrier and lowest at the orifices closest to it, precisely where the need for lubrication is greatest because the cage of the bearing exerts a high pressure on the tracks of the internal ring.

The present invention provides an improvement to this technology which optimizes the lubrication of a rotary planet carrier reduction gear for which the lubricating oil of the planet carrier is subjected to large centrifugal fields during operation.

DESCRIPTION OF THE INVENTION

According to a first aspect, the invention concerns an oil distribution device for a rotating planet carrier of a mechanical reduction gear of a turbomachine, characterized in that this device is configured to be integral, preferably coaxially, with a tubular member for supporting a bearing of the planet carrier, said device comprising an oil inlet and a row, preferably annular, of oil outlets opening onto an external surface intended to be surrounded at least in part by said member, said device comprising at least two internal cavities connected in series by at least one calibrated orifice, one of these cavities, referred to as a receiving cavity, being connected to said oil inlet, and internal calibrated channels for conveying oil which extends, preferably substantially radially, from said cavities to orifices in said external surface of the device to form said oil outlets.

In this patent application, "annular row" means a distribution around a circumference. In the case of the oil outlets, they are therefore distributed or dispatched around a circumference. The circumference extends here on the external periphery of the device and is thus centered on the axis of revolution of the device.

The invention thus proposes a device dedicated to the distribution of the oil in a tubular member of a mobile planet carrier of a reduction gear. This device may be in the form of a disc or comprise such a disc, which may be integrated into the member or attached to the latter. The device essentially comprises internal cavities, calibrated orifices for connecting the internal cavities to each other, and channels for connecting the cavities to oil outlet orifices located on the external periphery of the device.

The device is configured to be integral with the tubular member of the bearing support and is shaped to allow this assembly. Therefore, it does not necessarily have a perfectly circular peripheral contour, for example. This device is advantageously removable.

In this patent application, "calibrated" orifices and channels are defined as orifices and channels with a predetermined flow cross-section based on a desired oil flow rate. This calibration takes into account the position of the orifices and channels with respect to the axis of rotation of the planet carrier and therefore the centrifugal fields applied to the oil flowing through these areas during operation.

In this patent application, a tubular member of a planet carrier is defined as the combination of a tubular support and an internal ring of a rolling bearing. The internal ring is mounted around the tubular support and can be formed in one piece with this support. Alternatively, the ring is attached and mounted on the tubular support.

The device according to the invention may comprise one or more of the following features, taken alone or in combination with each other:

the device is configured to be attached and fixed, for example by shrink-fitting, in said tubular member, the cavities are arranged along a line which passes substantially through the center of the device and preferably through a radius of the device, said receiving cavity is close to the periphery of the device and is intended to be closest to an axis of rotation of the planet carrier when the device is mounted on the planet carrier, said device comprises an internal bore in which are inserted and fixed, for example by shrink-fitting, pellets which each comprise one of said calibrated orifices, said pellets defining between them said cavities, said bore is stepped and comprises several sections of different diameter and preferably arranged from the section of smallest diameter to the section of largest diameter, the latter opening out at the periphery of the device, said device comprises a circular base, one face of which is machined, and an annular cover attached to said base on the side of its machined face, said face being machined to define said cavities and channels between the base and the cover, said base comprises at its periphery an annular row of lunules connected to said oil outlets, one of said cavities is machined through the entire thickness of said base to also form said oil inlet, said base and said cover each comprise an annular row of fastening screw passage orifices, said base or said cover is integral with a gripping member to facilitate the assembly and disassembly of the device, said base and/or said cover comprises an indexing means for its angular positioning in the tubular support, each of said cavities has a general cylindrical shape, the axis of revolution of which is oriented perpendicularly to the plane of the device or located in the plane of the device, said oil inlet is closer to the external periphery of the device than to its center, said oil inlet is oriented in a direction perpendicular to the plane of the device, the channels are positioned symmetrically with respect to a plane perpendicular to said device, the channel diameters are chosen between 0.5 and 3 mm, preferably between 0.7 and 2 mm, and the diameters of the calibrated orifices are chosen between 0.5 and 7 mm, and preferably between 0.7 and 5 mm.

The present invention also concerns a rotary planet carrier for a mechanical reduction gear of a turbomachine, this planet carrier comprising an annular row of tubular members for supporting bearings which are parallel to each other and to an axis of rotation of the planet carrier, cylindrical tracks and surfaces for guiding rolling elements and at least one cage of these rolling elements being defined at the periphery of each of the tubular members, and at least one device as described above being coaxially integral with each of these tubular members.

The planet carrier according to the invention may comprise one or more of the following characteristics, taken in isolation from each other, or in combination with each other:

each of said tubular members comprises a tubular support comprising an external cylindrical surface for mounting an internal ring of a bearing, and on which are formed oil circulation grooves which are in fluid communication with said oil outlets of the device, on the one hand, and oil ducts formed in the internal ring, on the other hand, said grooves being substantially rectilinear and parallel to each other and to an axis of revolution of the cylindrical surface, each of said tubular supports comprises through-holes for fluid communication of said grooves with said oil outlets of the device, each of said grooves is connected to several ducts, on the one hand, and by a single hole to a single oil outlet and to a single channel of said device, on the other hand, at least some of said grooves have a width or angular extent about said axis of revolution which is greater than the diameter of the holes and channel connected to that groove, the channel is connected to the corresponding groove at a first longitudinal edge of that groove, and the holes are connected to that groove at a second longitudinal edge, opposite of this groove, and, for each groove, said first edge being further from said axis of rotation of the planet carrier than said second edge.

The present invention also relates to an aircraft turbomachine, characterized in that it comprises a device or a planet carrier as described above.

According to a second aspect, the invention concerns a rotary planet carrier for a mechanical reduction gear of a turbomachine, this planet carrier comprising an annular row of tubular members of a bearings supporting that are parallel to one another and to an axis of rotation of the planet carrier, each of said tubular members comprising an external peripheral surface defining cylindrical tracks and surfaces for guiding rolling elements and at least one cage of these rolling elements, and an internal cylindrical surface defining an internal chamber configured to be supplied with oil during operation, oil passages extending between the internal cylindrical surface and the external peripheral surface for conveying oil from said chamber to the rolling elements and the cage, characterized in that each of the tubular members comprises oil circulation grooves that are connected to channels forming at least part of said passages and extending from the grooves to said external peripheral surface, these grooves being substantially rectilinear and parallel to one another and to an axis of revolution of said internal cylindrical surface of the corresponding tubular member, at least some of said grooves having a width or angular extent about said axis of revolution that is greater than the diameter of the ducts connected to that groove, and at least some of said ducts being connected to the corresponding groove at one of the longitudinal edges of this groove that is closest to said axis of rotation of the planet carrier.

The invention relates here to a planet carrier in which each tubular member comprises an oil circulation network which is designed to better distribute the oil between the different channels. During operation, due to the centrifugal fields, the oil is forced to accumulate mainly at the longitudinal edges of the grooves that are furthest from the axis of rotation of the planet carrier. The oil accumulates in the grooves and simultaneously supplies the ducts that are located at the opposite longitudinal edges. The oil flow rates which supply these different ducts are therefore approximately the same, which guarantees optimum lubrication of the cylindrical tracks of the members.

The planet carrier according to the invention may comprise one or more of the following characteristics, taken in isolation from each other, or in combination with each other:

each of the said tubular members comprises a tubular support and an internal ring of at least one rolling bearing, this internal ring being integral with said support or attached and fixed around said support, each of said tubular supports comprises an external cylindrical surface on which said internal ring is mounted, said passages comprising, on the one hand, said ducts which extend between said external peripheral surface defined by the ring and said grooves, and, on the other hand, through-holes which extend between said internal cylindrical surface and said grooves, the grooves being formed between the tubular support and the ring, said grooves are formed on the external cylindrical surface of each tubular support, said holes are connected to the grooves at the other one of the longitudinal edges of these grooves, namely the one furthest from the axis of rotation of the planet carrier, each of said grooves is connected to several ducts, on the one hand, and to a single hole, on the other hand, a device for distributing oil is associated with each of said tubular members and comprises a device configured to be coaxially integral with the corresponding tubular member, said device comprises an oil inlet and a row, preferably annular, of oil outlets opening onto an external surface intended to be surrounded at least in part by the member, said device comprising at least two internal cavities connected in series by at least one calibrated orifices, one of these cavities, called a receiving cavity, being connected to said oil inlet, and calibrated internal channels for conveying oil extending, preferably substantially radially, from said cavities to orifices in said external surface of the device to form said oil outlets which are in fluid communication with said grooves, said device is configured to be attached and fixed, for example by shrink-fitting, in said tubular member.

The present invention also relates to an aircraft turbomachine, characterized in that it comprises a planet carrier as described above.

BRIEF DESCRIPTION OF THE FIGURES

Other characteristics and advantages will emerge from the following description of a non-exhaustive embodiment of the invention with reference to the annexed drawings on which:

FIG. 16 is a schematic cross-sectional view of a tubular member of a planet carrier, FIGS. 17 and 18 are schematic sectional views along lines A-A and B-B of FIG. 16.

DETAILED DESCRIPTION OF AN EMBODIMENT OF THE INVENTION

Figure 1:
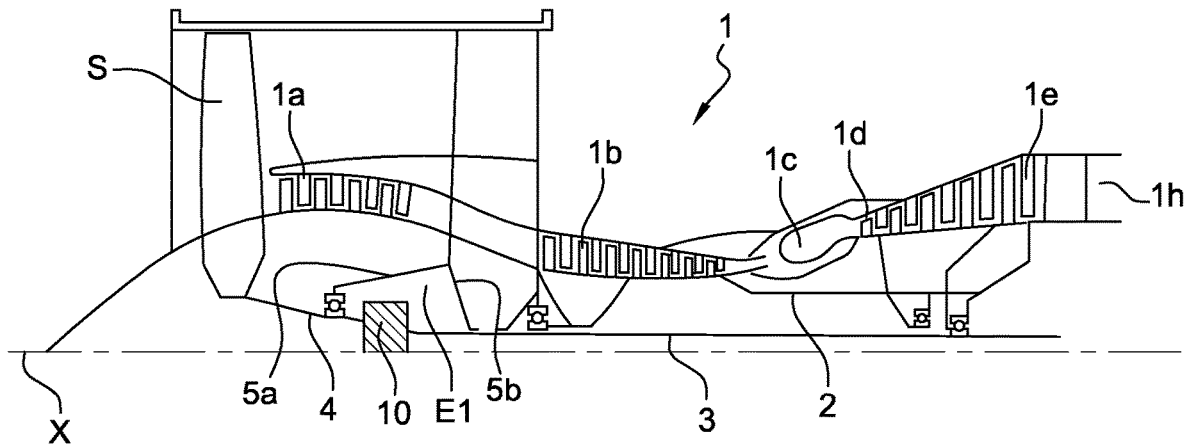
FIG. 1 is a schematic axial section view of an aircraft turbomachine.

FIG. 1 shows a turbomachine 1 which comprises, in a conventional manner, a fan propeller S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form a low-pressure body (LP) with it.

The fan propeller S is driven by a fan shaft 4 which is coupled to the LP shaft 3 by means of an epicyclic reduction gear 10, shown here schematically.

The reduction gear 10 is positioned in the front part of the turbomachine. A fixed structure comprising schematically, here, an upstream part 5a and a downstream part 5b is arranged so as to form an enclosure E1 surrounding the reduction gear 10. This enclosure E1 is closed upstream by seals at the level of a bearing allowing the passage of the fan shaft 4, and downstream by seals at the level of the passage of the LP shaft 3.

Figure 2:
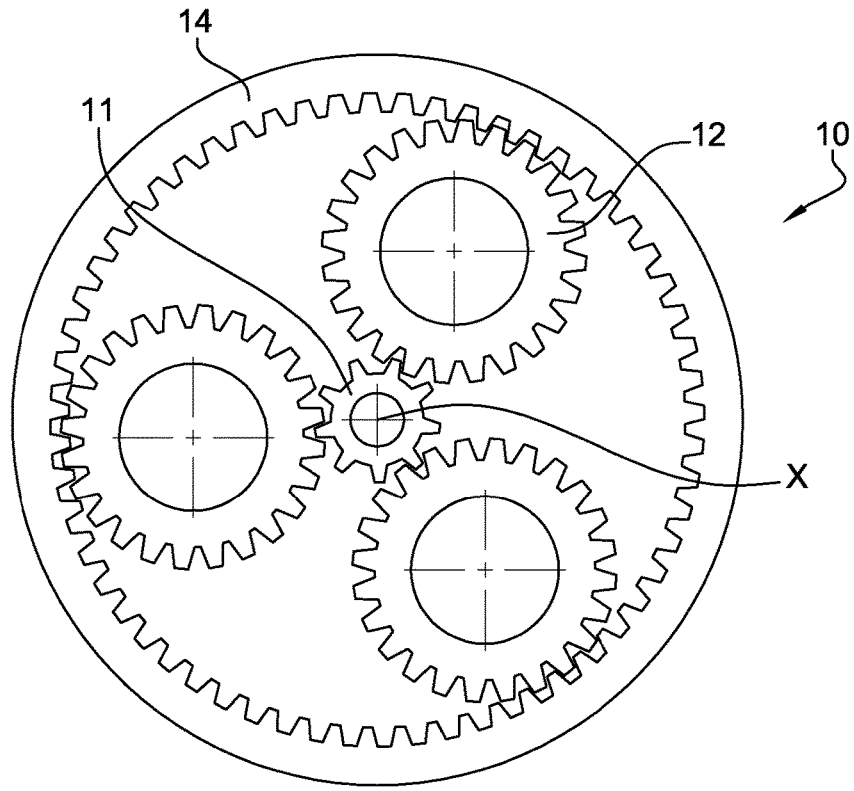
FIG. 2 is a very schematic and simplified view of an epicyclic gear train, in particular a speed reduction gear.

With reference to FIG. 2, the reduction gear 10 essentially comprises a planetary gear pinion called sun gear 11, the axis of rotation of which is centered on the axis X of the turbomachine, a ring gear 14 extending around the sun gear and the axis of revolution of which is centered on the axis X, and a series of planet gear pinions or planet gears 12 which are arranged between the sun gear 11 and the ring gear 14 and meshed with them. The number of planet gears 12 is usually defined between three and five, up to seven.

Figure 3:
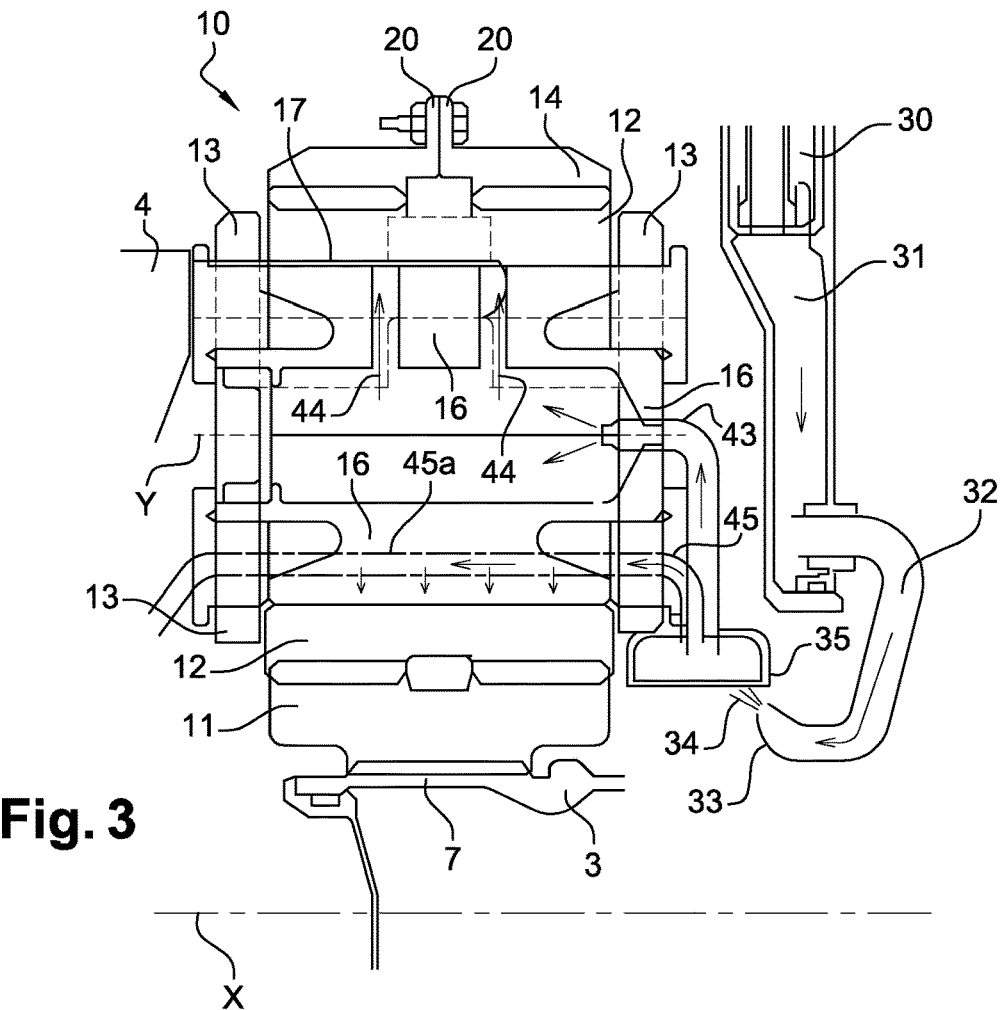
FIG. 3 is a partial schematic axial section view of a speed reduction gear with rotary planet carrier.

With reference to FIG. 3, the ring gear 14 is fixed and secured via flanges 20 to the fixed structure 5a, 5b of FIG. 1. The reduction gear 10 engages on the one hand on the LP shaft 3 via splines 7 which drive the sun gear 11, and on the other hand on the fan shaft 4 which is attached to a planet carrier 13. Each planet gear 12 rotates freely around an axis Y defined by a tubular support 16 carried by the planet carrier 13, with the help of a bearing 17.

The rotation of the planet gears 12 around their axis Y, due to the cooperation of their toothing with the toothing of the ring gear 14, causes the rotation of the planet carrier 13 around the axis X, and consequently the rotation of the associated fan shaft 4, at a rotation speed which is lower than that of the LP shaft 3.

Figure 4:
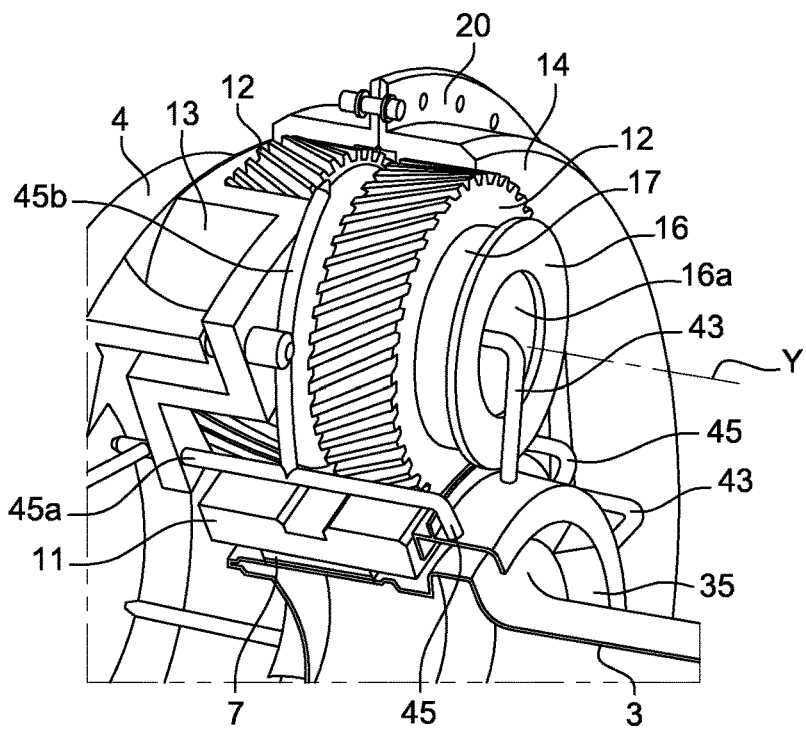
FIG. 4 is a schematic cutaway perspective view from of the reduction gear of FIG. 3.

FIGS. 3 and 4 show the conveying of the oil to the reduction gear 10 and its path within it. Arrows in FIG. 3 show the path of the oil from an adapter 31, which is connected to the fixed structure of the turbomachine, to the gears and bearings 17 to be lubricated, as shown in this example.

The lubrication means schematically comprise three parts which will be described below in succession, a first part linked to the fixed structure and delivering the oil to the rotating parts of the reduction gear 10, an impeller (or centrifugal scoop 35) rotating with the planet carrier 13 receiving this oil, and oil distribution circuits supplied with oil by the impeller to convey it to the places to be lubricated. The first part comprises at least one injector 32 whose calibrated end is tightened to form a nozzle 33. The oil is fed to the injector through a conveying pipe 30 from the engine tank (not shown). The adapter 31 can be placed next to the reduction gear 10 on the pipe, preferably at the top, so that the oil can flow to the center of the reduction gear by gravity. The nozzle 33 ejects the oil as a jet 34. The nozzle 33 is positioned here radially towards the inside of the planet carrier 13 and the scoop 35 with respect to the axis X and the jet 34 is oriented with a radial component directed towards the outside from the reduction gear 10 so that it strikes the bottom of the scoop 35. With reference to FIG. 4, the impeller for receiving oil connected to the planet carrier 13 essentially comprises a centrifugal scoop 35, here with a U-shaped cross-section, whose U-shaped opening is oriented in the direction of the axis of rotation X. The impeller is arranged on the planet carrier 13 in such a way that the bottom of the U of the scoop 35 collects the oil jet 34 ejected by the nozzle 33.

A first series of oil distribution circuits corresponds to the first pipes 43, which are distributed evenly around the circumference of the reduction gear 10 and in equal number to the number of the planet gears 12. These pipes 43 start radially from the scoop 35 and penetrate into the internal chamber 16a of each support 16 (FIG. 3), which is closed by the planet carrier 13. The oil flowing through the first pipes 43 enters the internal chamber 16a and then passes, due to centrifugal force, through passages 44, which pass through each support 16 in a radial direction. These passages 44 emerge at the periphery of the supports 16, at the level of the bearings supporting the pinions of the planet gears 12 and thus ensure the lubrication of these bearings. The second series of oil distribution circuits comprises second pipes 45 which run from the scoop 35 between the planet gears 12 and are divided into several channels 45a, 45b. The channels 45a, 45b convey the oil to the gears formed by the pinions of the planet gears 12 and the sun gear 11 on the one hand, and the pinions of the planet gears 12 and the external ring gear 14 on the other. Each channel 45a extends axially along the pinions of a planet gear 12, between them and the sun gear 11, and forms a lubrication ramp across the entire width of the pinions. The channel 45b, which supplies the gear between ring gear 14 and the pinions of the planet gears 12, projects its oil in the center of the cylinder formed by each planet gears 12. As shown, each planet gear 12 is realized as two parallel pinions that mesh respectively with two half-ring gears of the ring gear 14 (FIG. 3). The helixes of the toothing of each planet gear are oriented diagonally to the axis Y of rotation of the planet gear 12, so as to give them the function of grooves in which the oil is drawn from the center of the cylinder to its periphery to lubricate the gear over its entire width.

Figure 5:
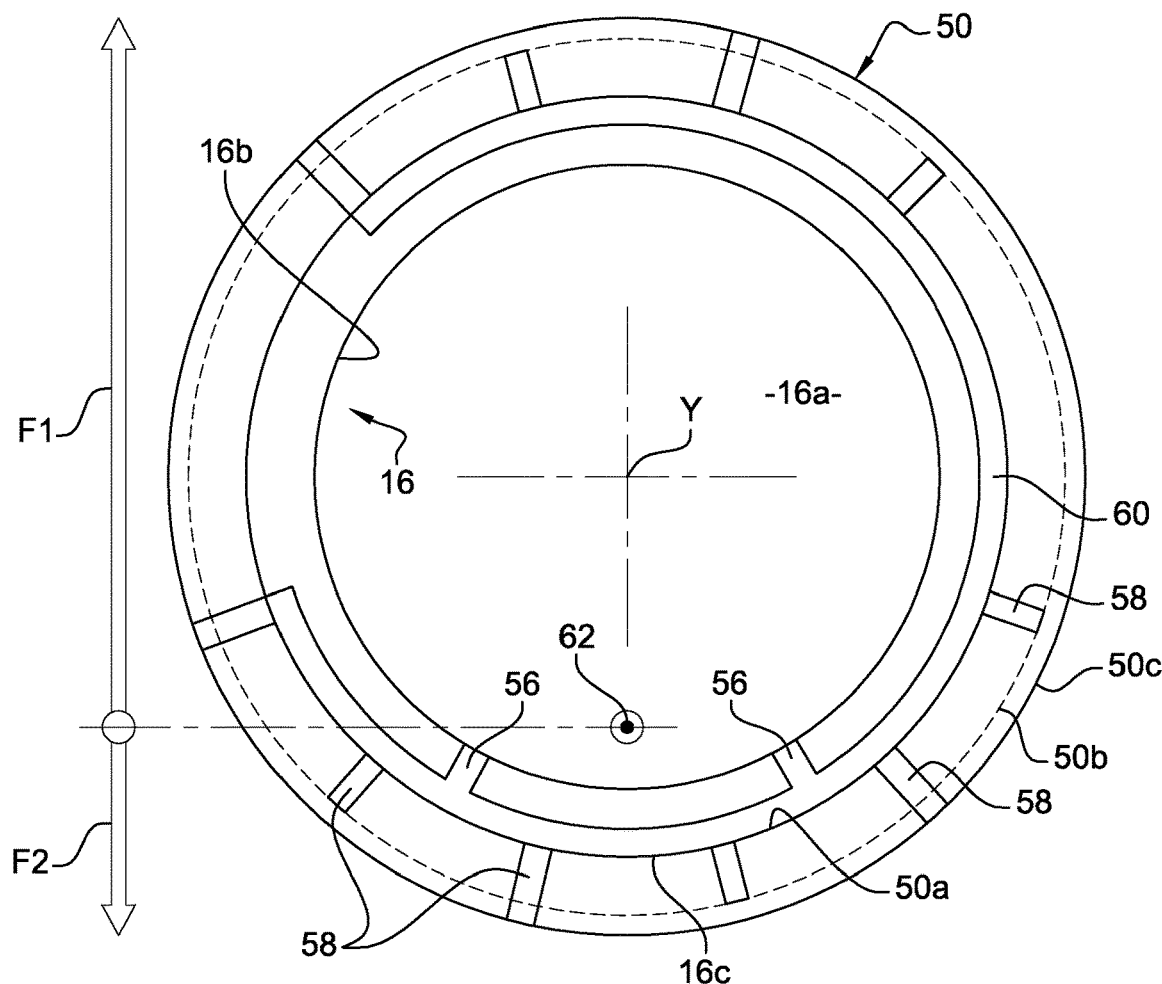
FIG. 5 is a schematic cross-sectional view of a tubular member of a reduction planet carrier.
Figure 6:
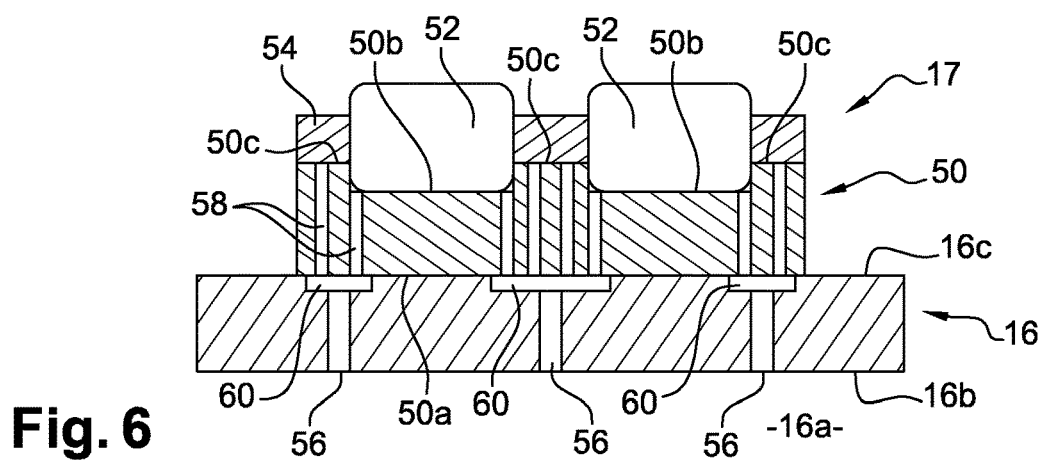
FIG. 6 is a schematic axial cross-sectional view of the tubular member of FIG. 5.

FIGS. 5 and 6 show very schematically one of the tubular supports 16 of planet carrier 13. This support 16 comprises an internal cylindrical surface 16b defining the above-mentioned internal chamber 16a, and an external cylindrical surface 16c on which is mounted an internal ring 50 of a bearing 17 here a rolling bearing, more precisely with rollers.

The combination of a tubular support 16 and an internal ring 50 of a rolling bearing forms, in the context of the present invention, a tubular member of a planet carrier. As is the case with the supports 16 and the rings 50, the tubular members are preferably distributed evenly around the sun gear of the reduction gear.

The internal ring 50 comprises an internal cylindrical surface 50a which is supported on the surface 16c and external cylindrical surfaces 50c between which external cylindrical guiding tracks 50b are arranged. There are two tracks 50b and they are used to guide two adjacent annular series of rollers 52. There are three surfaces 50c to guide the cages 54 for holding the rollers of the two series. Each track 50b is located between two surfaces 50c.

The oil that is fed into the chamber 16a of each tubular support 16 is conveyed to the bearing 17 through the above-mentioned passages 44 (FIG. 3), which comprise on the one hand holes 56 formed in the support 16 and on the other hand ducts 58 formed in the internal ring 50. The holes 56 have a substantially radial orientation and extend through the thickness of the support 16 from the surface 16b to circumferential grooves 60 formed on the surface 16c. The ducts 58 also have a substantially radial orientation and extend through the thickness of the internal ring 50 from the surface 50a to the tracks 50b and the surfaces 50c. Some ducts 58 open into the tracks 50b for the roller lubrication 52 and others open into the surfaces 50c for the lubrication of the cages 54.

In the case shown in FIGS. 5 and 6, the grooves 60 have a circumferential orientation and extend around the axis Y of revolution of the support 16 for about 300°. The reference 62 designates the oil supply point of the chamber 16a and thus the point of oil injection through the above-mentioned pipe 43 (FIGS. 3-4).

As mentioned above, the planet carrier 13 is mobile in rotation about the axis X (shown in FIG. 5) and the oil supply to each support 16 is made at a point 62 distant from this axis. The oil is centrifuged as soon as it is supplied from the chamber 16a. The centrifugal fields applied to the oil are greater the further away from the axis X the oil is applied. The arrows F1 and F2 represent the influence of these fields on the oil pressure. The further away from the axis from the point 62, the more the pressure increases due to the centrifugal fields, and the closer to the axis, the more the pressure decreases due to the centrifugal fields. The oil flow rate is therefore highest on the passages furthest from the center of rotation and lowest on the passages closest to the center of rotation, precisely where the need for lubrication is greatest (the cages 54 of the bearing 17 exerting high pressure on the tracks of the internal ring 50).

These flow rate differential problems can lead to high friction and material removal on the surfaces 50c of the ring 50.

Figure 7:
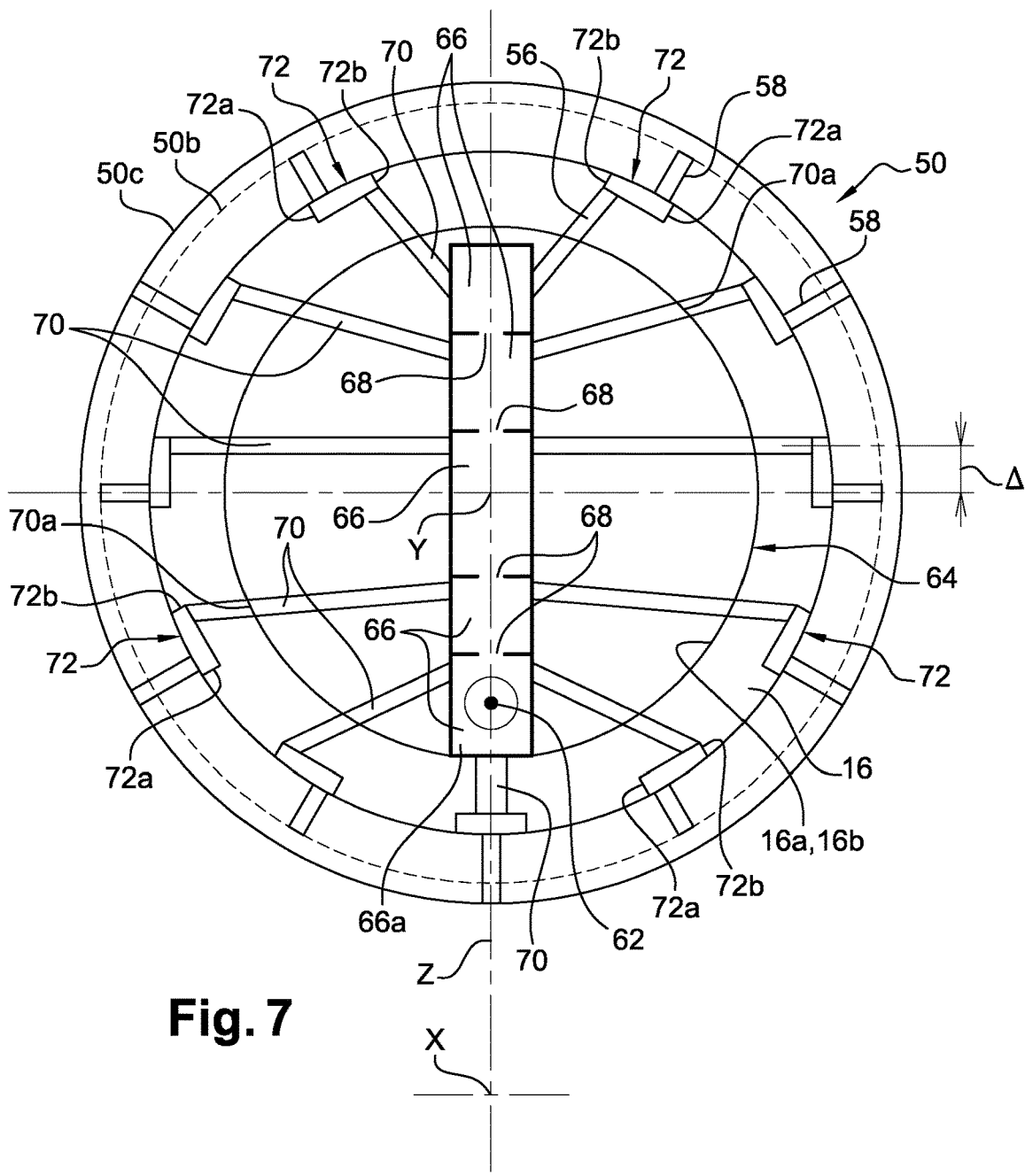
FIG. 7 is a schematic cross-sectional view of a tubular member of a planet carrier of reduction gear equipped with a device for distributing oil according to the invention.

The following description with reference to FIG. 7 and following explains the various aspects of the invention which allow an optimization of the lubrication of a reduction gear with rotary planet carrier for which the lubricating oil is subjected to large centrifugal fields during operation.

FIG. 7 illustrates two aspects of the invention.

The first aspect relates to the integration of a device 64 for distributing oil in each tubular support 16 of a planet carrier of a reduction gear.

The device 64 comprises a disc configured to be coaxially integral with a tubular support and comprising at least two internal cavities 66 connected in series by one or more calibrated orifices 68, one of these cavities, called the receiving cavity 66a, being connected to the oil inlet 62, and calibrated internal channels 70 for conveying oil extending from the cavities 66 to oil outlet orifices 70a provided at the external periphery of the disc.

The device 64 or the disc can be directly integrated and thus formed in one piece with the tubular support 16. Alternatively, it can be attached and fixed, e.g. by shrink-fitting, in the tubular support.

As in the example shown, the cavities 66 are preferably arranged along a line Z that runs approximately through the center of the disc. This line Z can be oriented in a radial direction with respect to the axis X of rotation of the planet carrier.

The cavities 66 are here five in number and are separated from each other by diaphragms comprising the above-mentioned calibrated orifices 68. The orifices 68 are aligned on the line Z in the example shown. The oil inlet 62 is connected to the cavity closest to the axis X and to the periphery of the disc.

The number of channels 70 can be a function of the number of cavities 66 and the number of grooves 72 which are formed on the external cylindrical surface 16c of the support and which are to be supplied with oil. Each groove 72 is supplied by a single channel 70 in the example shown and is connected to this channel by a single hole 56 in the support 16. The channels 70 as well as the cavities 66 preferably extend in the plane of the disc. They are formed, for example, in the thickness of this disc.

Each cavity 66 is connected to at least two channels 70. The cavity 66a connected to the oil inlet 62, which is located closest to the axis X, is connected by three channels 70 to three grooves 72. One of these three channels 70 extends from the cavity 66a towards the axis X, along the line Z, and the other two extend on either side of the cavity 66a. The other cavities 66 are connected by two channels 70 with two grooves 72, the two channels of each cavity being located on either side of this cavity. The channels extend substantially radially from the axis Y of the support radially outwards and the device is symmetrical with respect to a plane passing through the line Z and perpendicular to the plane of the disc.

The holes 56 of the support extend here in the extension of the channels 70 of the device and their oil outlet orifices 70a.

According to the invention, the grooves 72 have an axial orientation and not a circumferential one, i.e. they extend along the axis Y. The number of grooves 72 can vary and depends in particular on the number of angular sectors of tracks 50b and surfaces 50c to be lubricated, independently of each other. In the example shown, this number is eleven.

The grooves 72 preferably have a width or circumferential dimension around the axis Y which is greater than the diameter of channels 70, holes 56 and ducts 58. As can be seen in FIG. 7, each groove 72 comprises two opposite longitudinal edges 72a, 72b, a first 72a of which is located closest to the axis X (with the respect to the second) and is connected to the ducts 58, and the second 72b of which is located furthest from this axis X (with respect to the first) and is connected to the hole 56.

This misalignment A between the ducts 58, on the one hand, and the channel 70 and the hole 56, on the other hand, concerns the second aspect of the invention and ensures an equitable distribution of oil in all the holes 56 located on the same angular sector, from the upstream to downstream of the internal ring 50, and this despite the supply of oil through a single channel 70 and a single hole 56. Indeed, during operation, the oil is fed through the corresponding channel 70 into the groove 72 at its longitudinal edge 72b, the oil then reaches the ducts 58 which are connected to the opposite edge 72a and are preferably all located in the same axial plane for a given sector of the ring 50.

In order to balance the flow rates in the different holes 56, the diameters of the calibrated orifices 68 of the diaphragms and the sections of the channels 70 can be adjusted. These must decrease as they move away from the axis X, in a proportion to be defined by a hydraulic model. The channels 70 which extend from a cavity 66, substantially towards the axis X, as is the case of the channels connected to the cavity 66a attached to the oil inlet 62, therefore have a passage section which can increase towards the axis X. The channels 70 that extend from a cavity 66, substantially opposite to the axis X, therefore have a passage cross section that can decrease towards the axis X. Finally, the channels that are globally at the same distance from the axis X, over their entire extent, could have an identical passage section. The diameters of the calibrated orifices 68 decrease as they move away from the axis X. The diameters of the channels 70 can vary between 0.5 and 3 mm, and preferably between 0.7 and 2 mm. The diameters of the calibrated orifices 68 can vary between 0.5 and 7 mm, preferably between 0.7 and 5 mm.

Thanks to the symmetry of the device 64, the channels 70 located on either side of each cavity 66 receive the same flow rate, which is impossible to obtain with circumferential grooves as shown in FIGS. 5 and 6.

Figure 8:
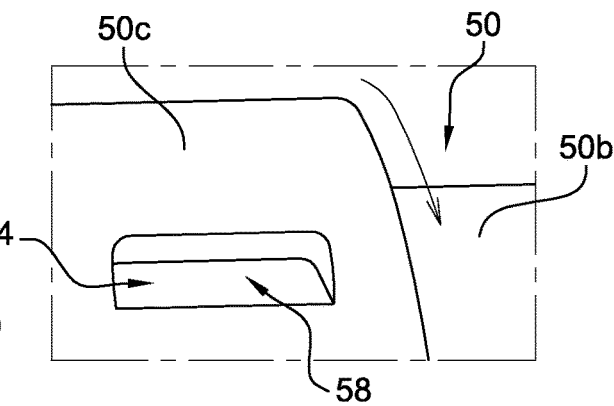
FIG. 8 is a partial schematic and perspective view of a cylindrical track for guiding a cage of a rolling bearing of the reduction gear.

Given the high pressure exerted by the cages 54 which are centrifuged against the support 16, the ducts 58 of the internal ring 50 opening onto the surfaces 50c of the cages (the ones closest to the center of rotation, circled in FIG. 7) should allow the formation of an oil wedge for hydrodynamic operation. The formation of this oil wedge can be facilitated by creating basins 74 (FIG. 8) on the tracks, into which the ducts 58 open.

FIGS. 9 to 12 illustrate a first example of the embodiment of an oil distribution device 64 according to the invention.

The device 64, still in the form of a disc, comprises here two parts, namely a base 76 and a cover 78, both annular and intended to be fixed coaxially to each other.

Figure 9:
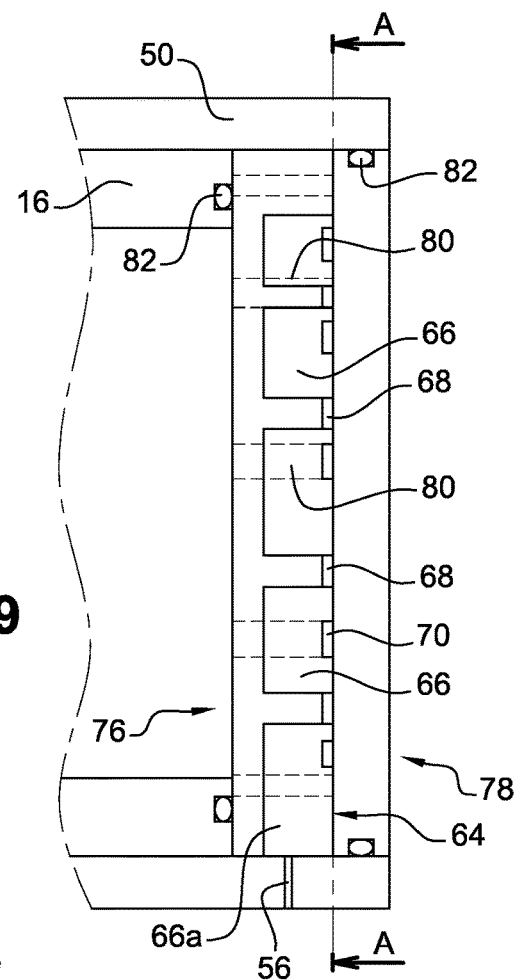
FIG. 9 is a schematic view in axial section of an alternative embodiment of the device according to the invention.

As described above, the device 64 is here intended to be engaged in tubular support 16 and to be fixed to it by shrink-fitting. The base 76 and the cover 78 preferably have the same external diameter and are both intended to be shrink-fitted into the tubular support 16, or into the support 16 and the ring 50, as shown in FIG. 9. Annular seals 82 can be fitted between the device and the support 16 and/or the ring 50 to prevent oil leakage during operation.

The base 76 comprises two parallel flat faces, one of which is machined to define the locations, volumes and dimensions of the cavities 66, orifices 68 and channels 70. The cover 78 is added to the base 76 to close these volumes. The channels 70 extend here from cavities 66 to straight external lunules 80, which are parallel to each other and to the axis Y of the device, and are intended to be connected to the above-mentioned holes 56 or grooves 72.

The base 76, for example, is machined using a single ball milling cutter. The hydraulic diameter of each portion would then be adjusted by, for example, playing on the penetration depth of the milling cutter. FIG. 9 shows, for example, that the machining depth of the cavities 66 is greater than that of the channels 70 and orifices 68. The contact surfaces of the base 76 and the cover 78 must be perfectly flat and ground to ensure a good sealing. The shrink-fitting of the device 64 must prevent the passage of oil between the lunules 80.

The cavity 66a which is located closest to the periphery of the device is here the one located closest to the axis X and which is connected to the oil inlet 62. This cavity opens radially on the external periphery of the base 76 so that a hole 56 of the support 16 can be directly in fluid communication with this cavity (without intermediate channel— FIG. 9).

Figure 11:
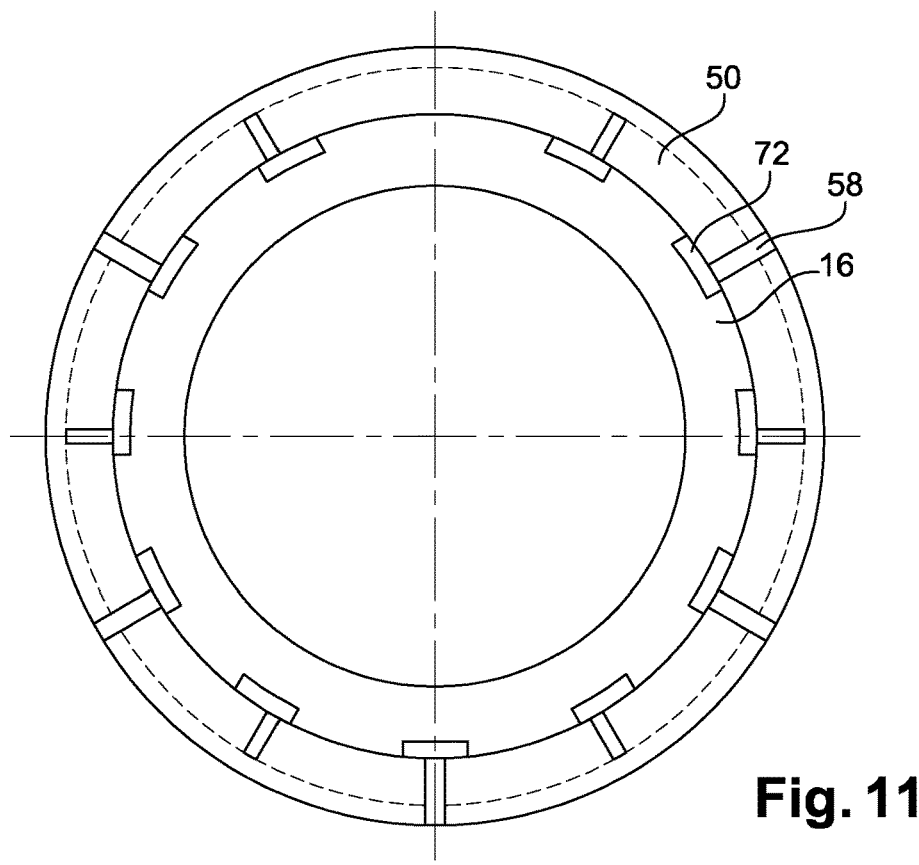
FIGS. 11 and 12 are schematic cross-sectional views of the tubular member in FIG. 9, without and with the device.

FIG. 11 shows a tubular support 16 and the internal ring 50 mounted on this support, and illustrates the second aspect of the invention described above. Each groove 72 is connected, on the one hand, to several ducts 58 located in different planes perpendicular to the axis Y, and, on the other hand, to a single hole 56. The holes 56 of the support do not appear here because the section shown does not pass through these holes. This section passes through one of the ducts 58 for each groove 72.

Figure 10:
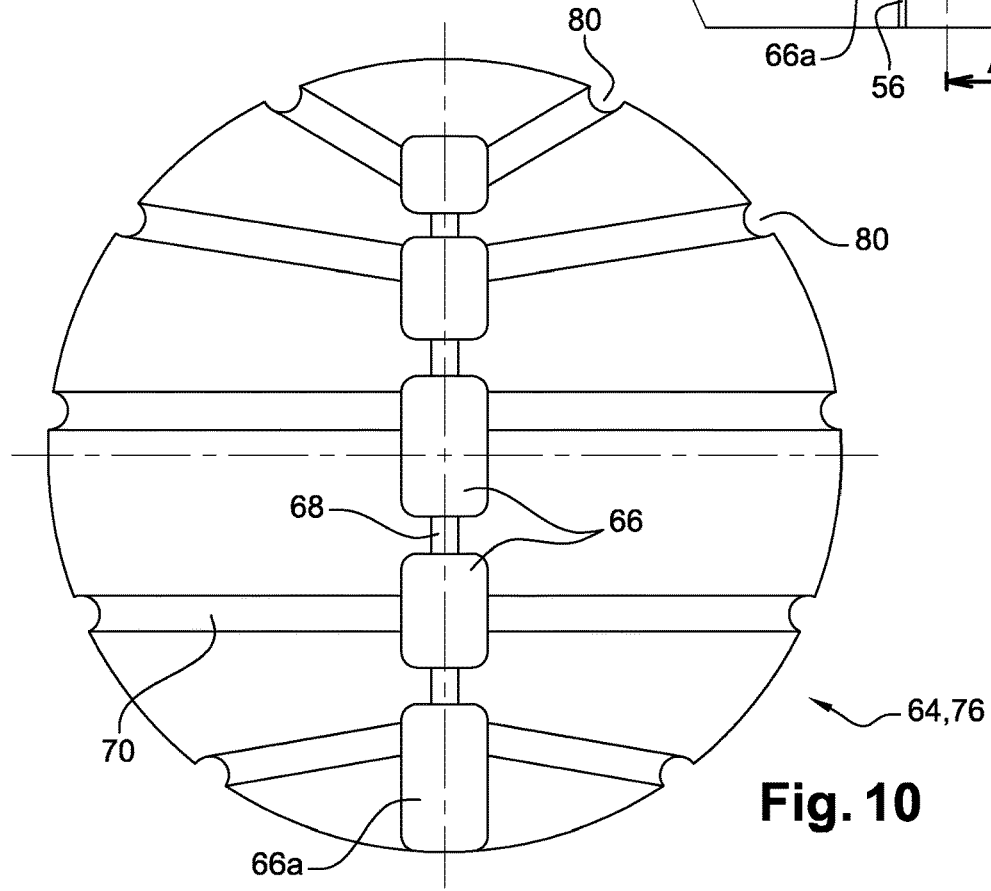
FIG. 10 is a schematic cross-sectional view along line A-A of FIG. 9, the device being mounted in a tubular member of a planet carrier.
Figure 12:
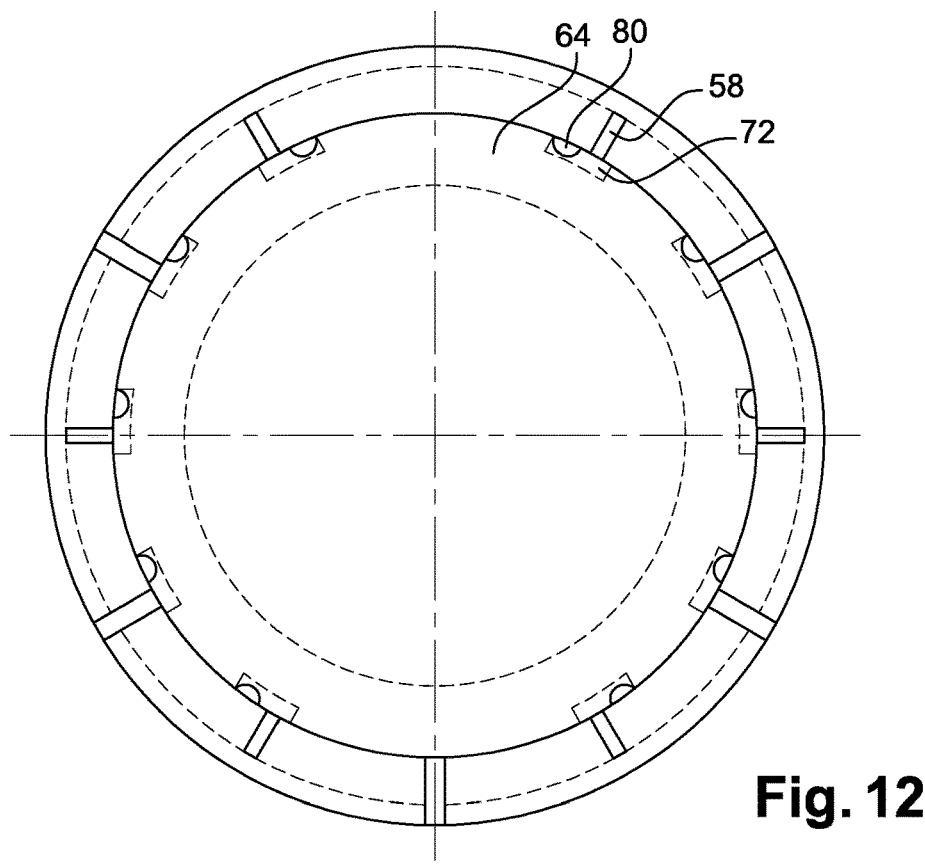

FIG. 12 shows a similar view with the device in FIGS. 9 and 10, which is mounted coaxially to the support. As can be seen in this figure, the lunules 80 are aligned facing the grooves 72, and in particular the longitudinal edges 72b of these grooves, the furthest from the axis X.

Figure 13:
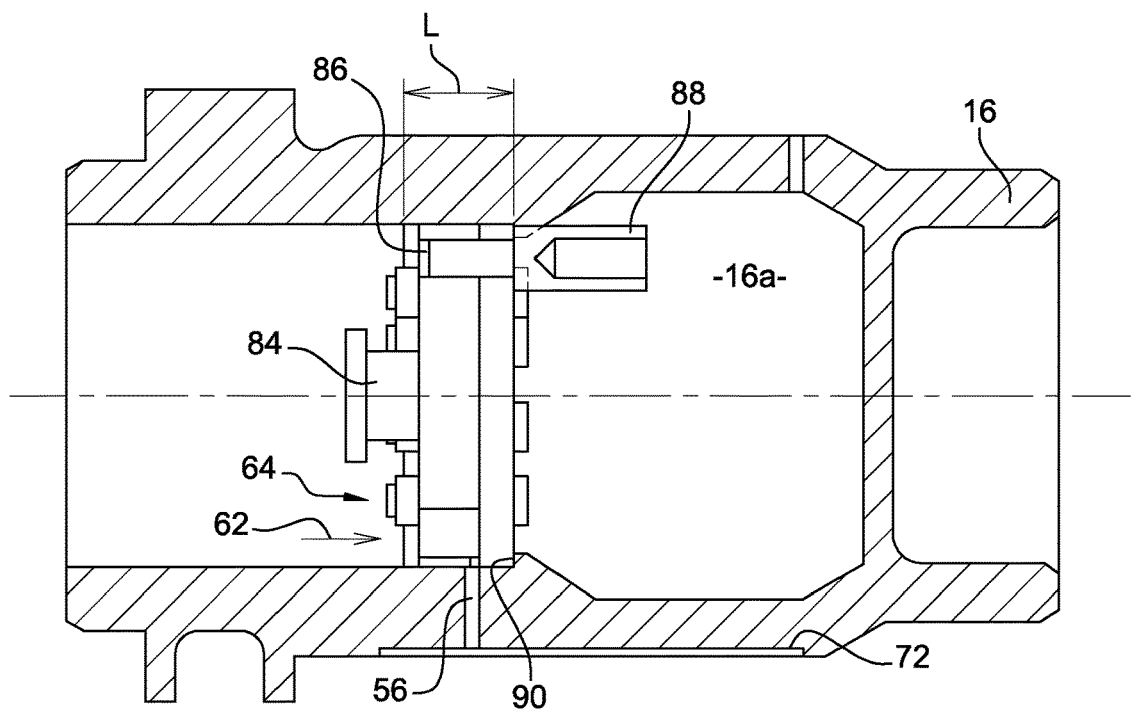
FIG. 13 is a schematic view in axial section of a tubular member of a planet carrier, equipped with an alternative embodiment of the device according to the invention.
Figure 23:
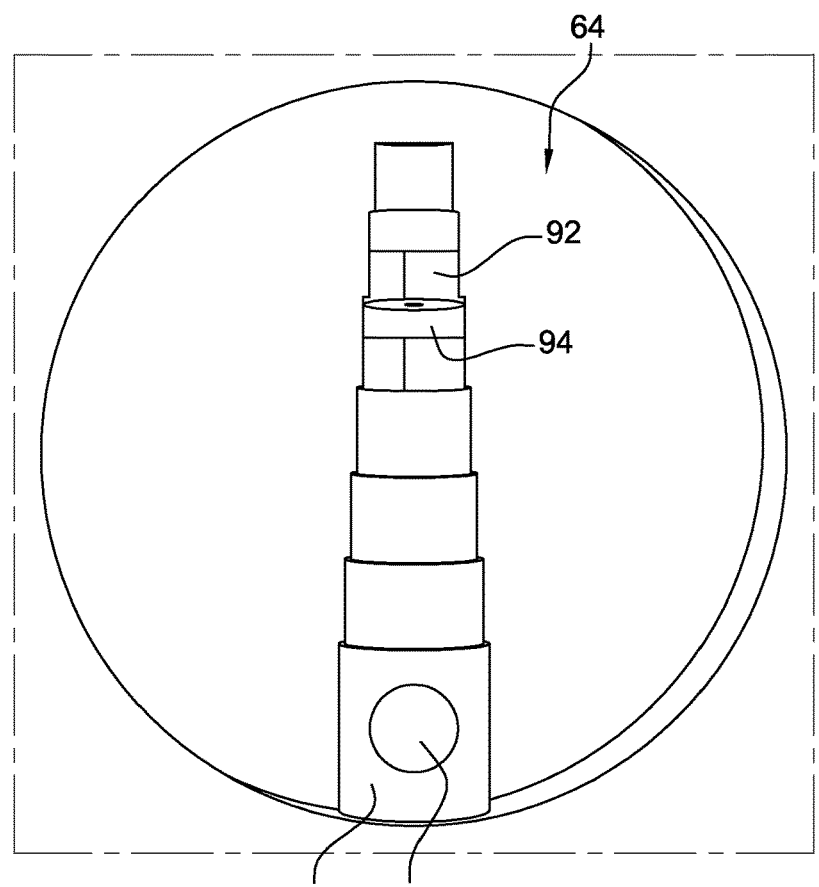
FIG. 23 is a schematic view in perspective of another alternative embodiment of a device according to the invention.
Figure 14:
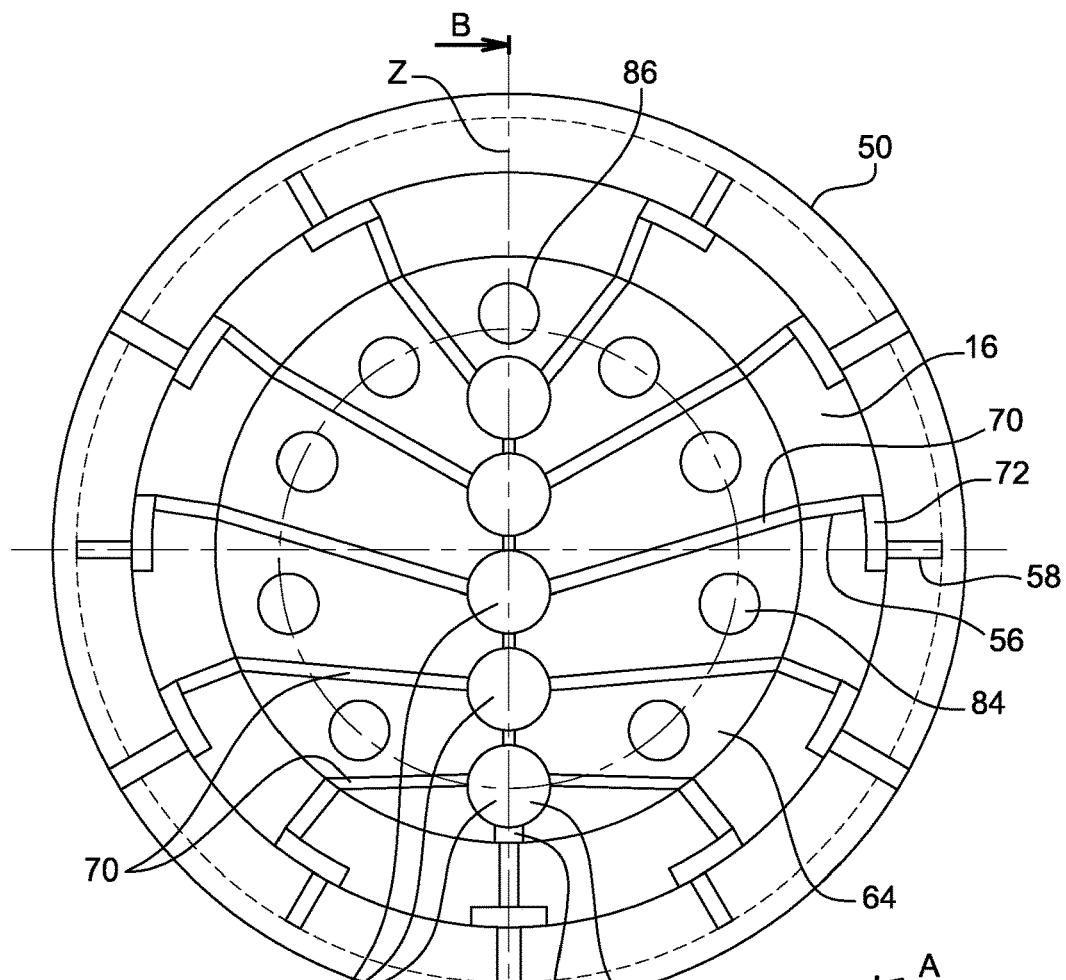
FIG. 14 is a schematic cross-sectional view of the tubular member of FIG. 13.
Figure 15:
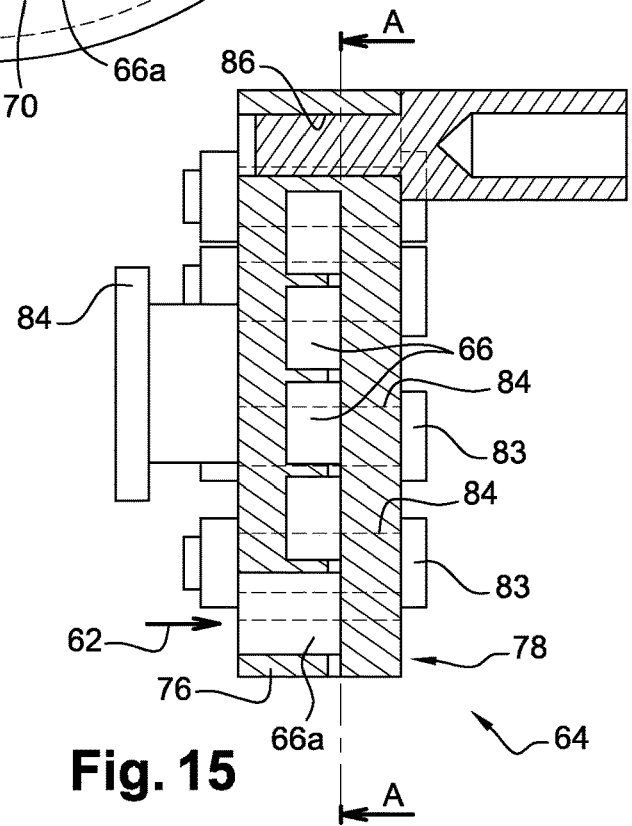
FIG. 15 is a schematic cross-sectional view along the B-B line of the device for distributing in FIG. 13.

FIGS. 13 to 15 illustrate a second example of the embodiment of an oil distribution device according to the invention.

Like the previous embodiment, the device 64, still in the form of a disc, comprises here two parts, namely a base 76 and a cover 78, both annular and intended to be fixed coaxially on each other.

The device 64 is here intended to be inserted into the tubular support 16 and to be fixed to it by shrink-fitting (FIG. 13). The base 76 and the cover 78 preferably have the same external diameter and are both intended to be shrink-fitted into the tubular support.

The base 76 comprises two parallel flat faces, one of which is machined to define the locations, volumes and dimensions of the cavities 66, orifices 68 and channels 70. The cover 78 is attached to the base to close these volumes. The assembly is secured by bolts 83 that pass through aligned orifices 84 in the base and cover (FIGS. 14 and 15). A lock wire can be used to connect bolts 83 together to prevent accidental loosening.

For example, the base 76 is machined using a single ball milling cutter. The hydraulic diameter of each portion would then be adjusted by, for example, playing with the penetration depth of the cutter. FIG. 9 shows, for example, that the machining depth of cavity 66 is greater than that of the channels 70 and orifices 68. The bearing surfaces of the base and cover must be perfectly flat and ground to ensure a good sealing.

The cavity 66, which is located closest to the periphery of the device, is here the one closest to the axis X and is connected to oil inlet 62. This cavity is connected by a channel 70 aligned on the line Z to the corresponding hole 56 in the support 16. In addition, this cavity opens axially into chamber 16a of the support 16 to be connected to the oil inlet 62.

The cavities here have a general cylindrical shape with the axis oriented perpendicular to the plane of the disc forming the device.

In the example shown, the base 76 is attached to a gripping device 84 to facilitate the assembly and disassembly of the device and, in particular, its shrink-fitting. The device 64 also comprises an indexing means for its angular positioning in the tubular support 16. This may be an orifice 86 passing through the base and cover and positioned in a predetermined location, for example diametrically opposite the oil inlet 62. During assembly, an operator is intended to angularly position the device in the support by means of an indexing pin 88 which is intended to be engaged in the orifice 86.

Advantageously, the length of the pin 88 intended for engagement in the orifice 86 is greater than the length L of the shrink-fitting zone of the device in the support 16, so that the engagement of the pin in the lunule of the shoulder 90 and thus the angular positioning of the device takes place before the device is actually shrink-fitting into the support. The clamping would make it difficult to position the device angularly afterwards.

The device 64 is preferably axially supported on an internal cylindrical shoulder 90 of the support in the position shrink-fitted. In addition to shrink-fitting, the oil pressure on the upstream face of the device prevents the device from moving away from the shoulder 90 against which it abuts.

FIGS. 16 and 17 show the number and position of the lubrication ducts 58 of the tracks 50b, which are connected to one of the longitudinal edges 72a of a groove 72. As mentioned above with respect to the second aspect of the invention, the hole 56 is connected to the opposite longitudinal edge 72b of this groove, but its axial position with respect to this groove is of little importance. The same applies to each supply hole 56 of an oil conveying groove to the lubrication ducts of the surfaces 50c (FIGS. 16 and 18).

Figure 19:
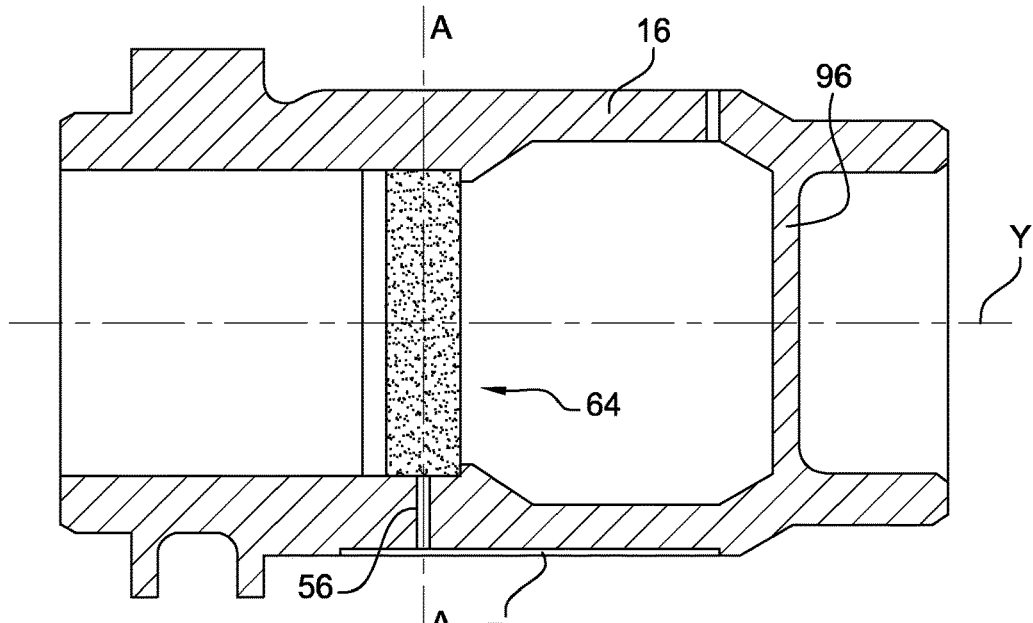
FIG. 19 is a schematic view in axial section of a tubular member of planet carrier, equipped with another alternative embodiment of the device according to the invention.
Figure 20:
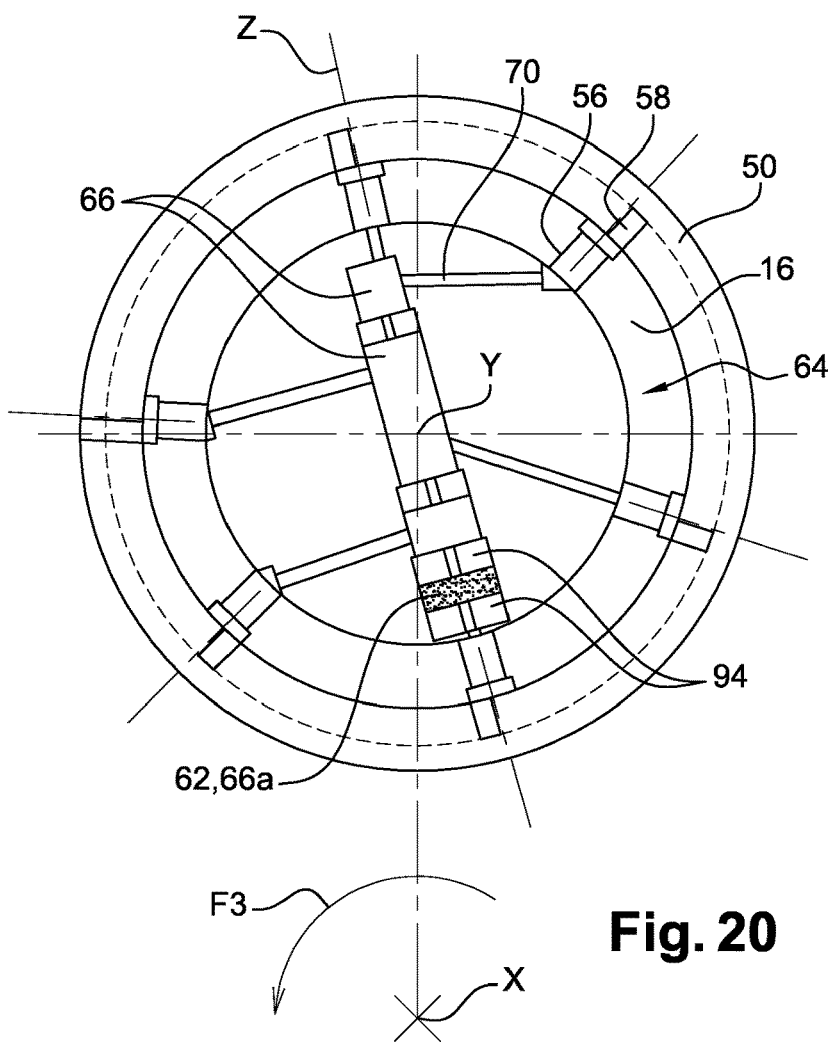
FIG. 20 is a schematic cross-sectional view according to line A-A of FIG. 19.
Figure 21:
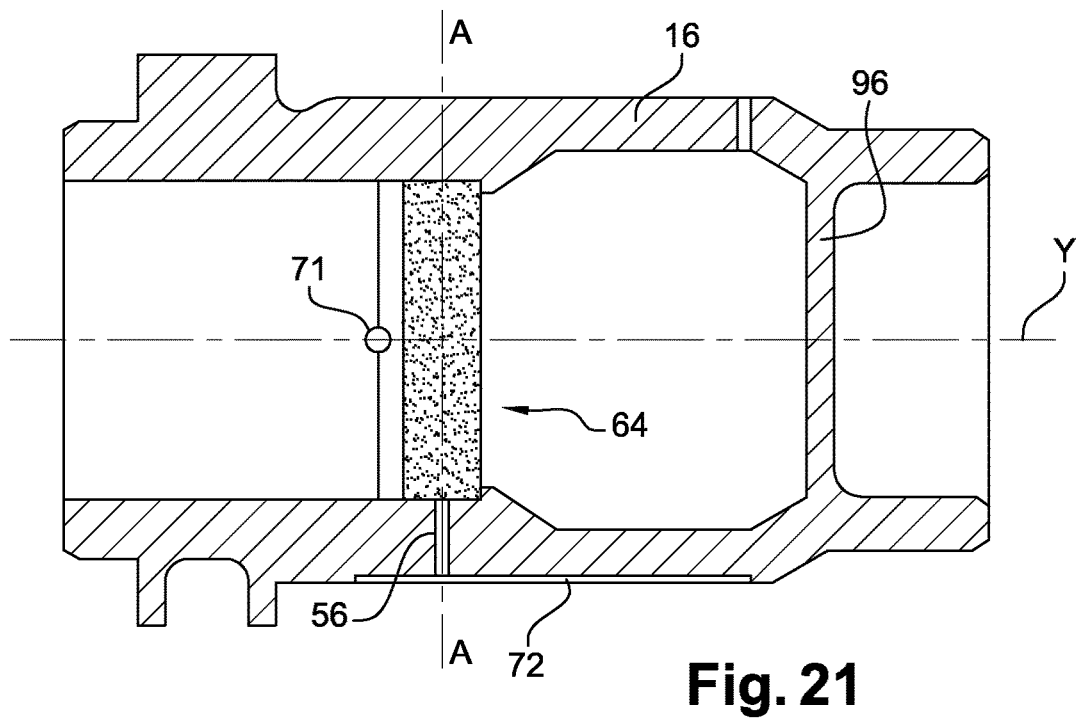
FIG. 21 is a schematic view in axial section of a tubular member of a planet carrier, equipped with another alternative embodiment of the device according to the invention.

FIGS. 18 and 19, on the one hand, and FIGS. 20 and 21, on the other hand, illustrate two other examples of embodiments of an oil distribution device according to the invention.

Figure 22:
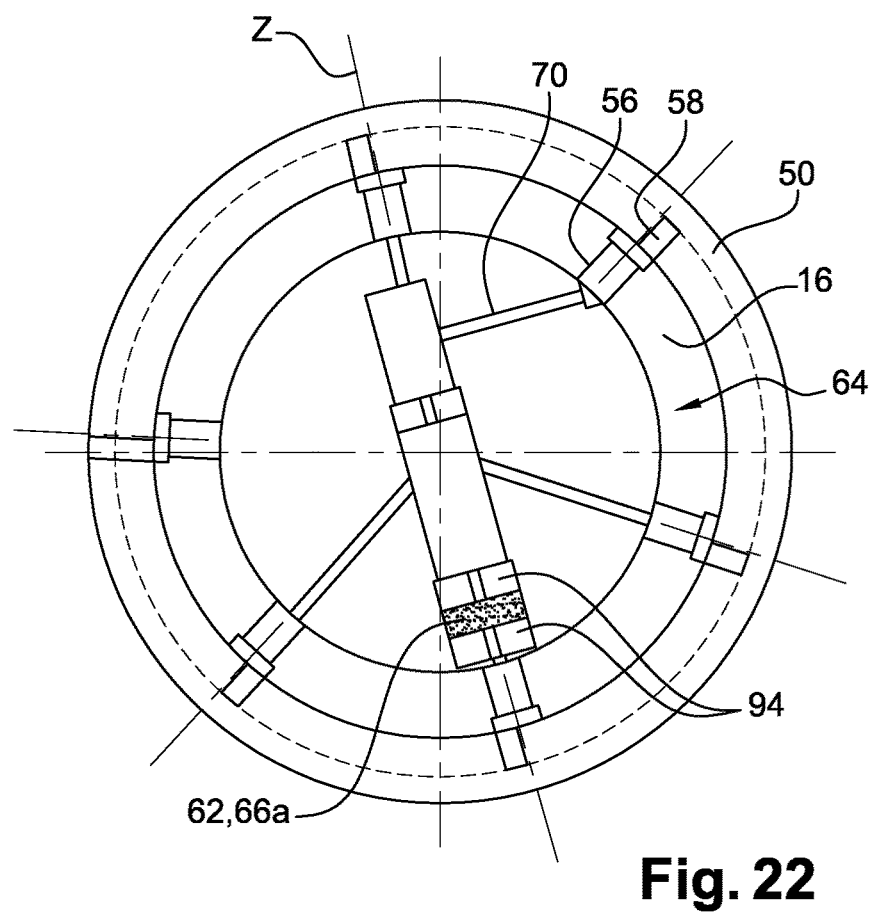
FIG. 22 is a schematic cross-sectional view along line A-A of FIG. 21.

These two embodiments use a device in the form of a disc as shown in FIG. 22. The disc comprises in its plane an internal bore 92 which is stepped along the line Z and comprises a series of sections of different diameters and arranged in an increasing or decreasing manner according to the direction considered along the line Z. The bore is made, for example, by means of a drill or several drills with flat end(s). Pre-drilled pellets 94 are inserted and fixed, preferably by shrink-fitting, in the sections of the bore 92 and are intended to define the above-mentioned cavities 66 of the disc between them. The pellets 94 are pre-drilled to define the calibrated orifices 68 and thus form the diaphragms mentioned above. The larger diameter cavity is intended to be connected to the oil inlet 62 and opens at the periphery of the disc. The bore 92 is made by machining the disc starting with this larger diameter cavity. The number of sections of the bore corresponds to the number of cavities in the disc.

In the alternative embodiment of FIGS. 19 and 20, the device 64 does not present a symmetry as evoked in the above. The cavities 66 are well aligned along a line Z which is not oriented in a radial direction with respect to the axis X of rotation of the planet carrier but is slightly offset to favour the appearance of an oil wedge. The channels are not necessarily evenly distributed around the axis Y of the support 16. Here, the device comprises only four cavities 66 and six channels 70. Five channels 70 supply holes 56 fed by oil to the tracks 50b for guiding the rollers, and one channel 70 supplies the hole fed by oil to the track for guiding the cage(s). The arrow F3 shows the direction of rotation of the cage.

In the alternative embodiment shown in FIGS. 21 and 22, the device 64 does not have the symmetry as shown above. The cavities 66 are well aligned along a line Z. The line Z is not oriented in a radial direction with respect to the axis X of rotation of the planet carrier but it is slightly offset to favour the appearance of an oil wedge. The channels are not necessarily evenly distributed around the axis Y of the support 16. Here, the device includes only four cavities 66 and five channels 70. All of these channels 70 feed oil supply holes 56 to the tracks 50b for guiding the rollers. These holes are all located in the same plane perpendicular to the axis Y. The oil supply to the track for guiding the cage is provided by a simple hole 71.

FIGS. 19 and 21 also show a tubular support 16 of a planet carrier. It can be seen that this support comprises a transverse wall 96 in the thickness of which could be formed the device according to the invention which could thus be integrated into the support.

The invention claimed is:

1. An oil distribution device for a rotating planet carrier of a mechanical reduction gear of a turbomachine, the oil distribution device being integral with a tubular member for supporting a bearing of the rotating planet carrier, said oil distribution device comprising:
   an oil inlet and a row of oil outlets opening onto an external surface configured to be surrounded at least in part by the tubular member; and
   at least two internal cavities connected in series by at least one calibrated orifice,
   wherein a receiving cavity of the at least two internal cavities is connected to said oil inlet, and internal calibrated channels for conveying oil extend from said at least two internal cavities to orifices of said external surface to form said row of oil outlets.

2. The oil distribution device according to claim 1, wherein the oil distribution device is configured to be attached and fixed in said tubular member.

3. The oil distribution device according to claim 1, wherein the at least two internal cavities are arranged along a line (Z) which passes through a center of the oil distribution device.

4. The oil distribution device according to claim 3, wherein said receiving cavity is disposed at a periphery of the oil distribution device and is configured to be closest to an axis (X) of rotation of the planet carrier when the oil distribution device is mounted on the planet carrier.

5. The oil distribution device according to claim 1, further comprising an internal bore in which are inserted and fixed, pellets which each comprise one of the said at least one calibrated orifice, the pellets delimiting between them said at least two internal cavities.

6. The oil distribution device according to claim 5, in which said internal bore is stepped and comprises a plurality of sections of different diameters.

7. The device according to claim 6, wherein the plurality of sections of different diameters is arranged from a smallest diameter section to a largest diameter section opening out at the periphery of the oil distribution device.

8. The oil distribution device according to claim 1, further comprising:
   a circular base having a machined face; and
   an annular cover attached to said circular base, on a side of the machined face, the machined face being machined to define said at least two internal cavities and said internal calibrated channels between the circular base and the annular cover.

9. A rotating planet carrier for a mechanical reduction gear of a turbomachine, comprising an annular row of tubular members configured for supporting bearings which are parallel to each other and to an axis (X) of rotation of the rotating planet carrier, cylindrical tracks and surfaces configured for guiding rolling elements and at least one cage of the rolling elements being defined at a periphery of each of the tubular members, and at least one oil distribution device according to claim 1 being integral coaxially with each of these the tubular members.

10. The planet carrier according to claim 9, wherein each of the tubular members comprises a tubular support comprising an external cylindrical surface configured for mounting an inner ring, and on which tubular member are formed oil circulation grooves which are in fluid communication with said oil outlets of the oil distribution device and oil ducts formed in the inner ring, wherein said grooves are rectilinear and parallel to each other and to an axis of revolution (Y) of the cylindrical surface.

11. An aircraft turbomachine, comprising the rotating planet carrier according to claim 9.

12. An aircraft turbomachine, comprising an oil distribution device according to claim 1.

* * * * *